Feb. 12, 1946.  P. C. GERATY  2,394,762
METHOD OF MAKING ELASTIC COIL CABLES
Filed Aug. 25, 1944
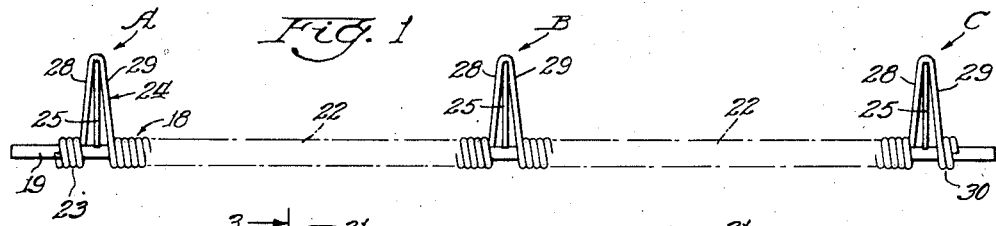
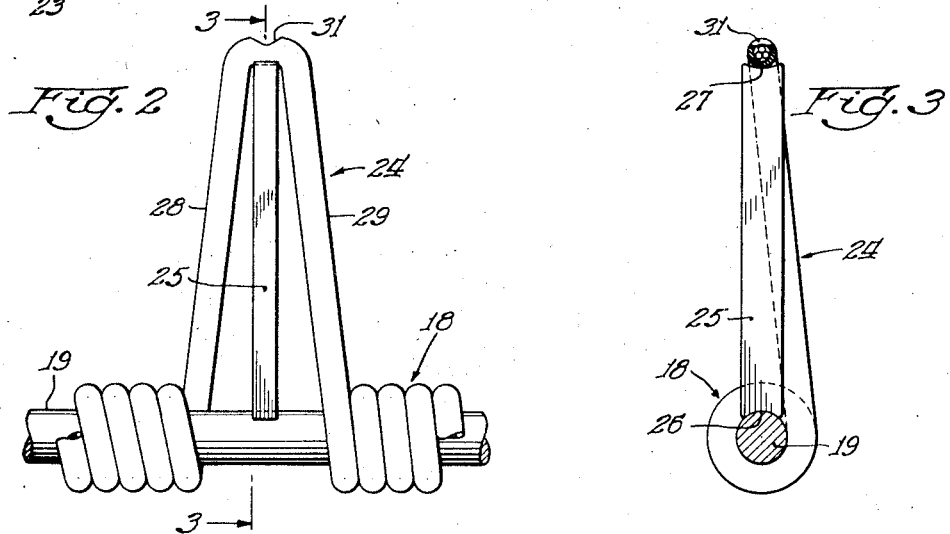
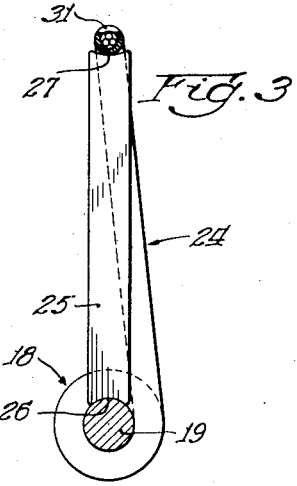
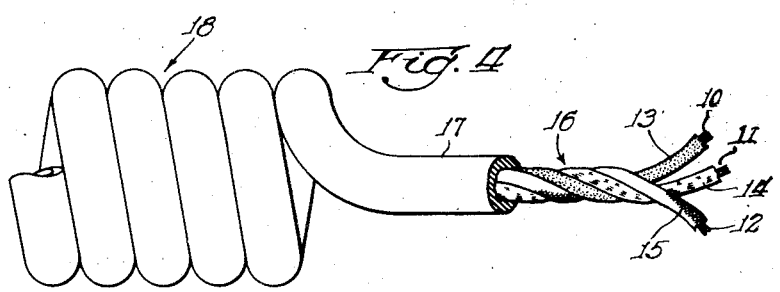
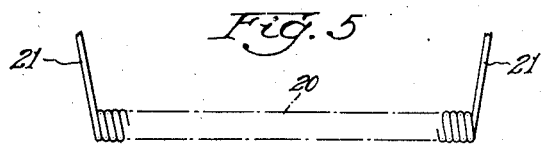
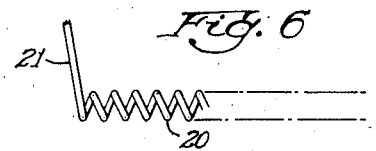
Inventor:
Paul C. Geraty
By: A. Trevor Jones
Atty.

Patented Feb. 12, 1946

2,394,762

UNITED STATES PATENT OFFICE 2,394,762

METHOD OF MAKING ELASTIC COIL CABLES

Paul C. Geraty, Chicago, Ill., assignor, by mesne assignments, to Kellogg Switchboard and Supply Company, Chicago, Ill., a corporation of Illinois, and to Ralph D. Collins, Beverly Hills, Calif.

Application August 25, 1944, Serial No. 551,246

2 Claims. (Cl. 18—47.5)

The present invention relates to a method of making elastic coil cables.

It is now well known that retractile and extensible extension cords or cables, for various purposes, principally electrical, may be satisfactorily constructed by providing a conductor or a plurality of conductors with a covering or sheath of incompletely vulcanized rubber or the like, then closely coiling it into the form of a helix, and then vulcanizing it, after which the cable will be readily extensible, as, for example, for extension cord purposes, without damage thereto while being automatically retracted by its own resilience to closely coiled helical formation when released.

For certain broader aspects of the subject-matter here disclosed see Collins application Serial No. 577,111, filed February 9, 1945, and for certain other aspects see Arnold application Serial No. 551,245, filed August 25, 1944.

The present invention aims to set forth improvements in methods of making cables of this class, and will be understood by reference to the following description, taken together with the accompanying drawing, showing illustrative embodiments of the invention, and in which:

Figure 1 is a view of a plurality of preliminarily interconnected lengths of cordage of this type before the lengths are severed to provide a plurality of individual cables, and as the unsevered preliminarily continuous lengths may be prepared, in accordance with the present invention, for curing, and showing in this instance three humps formed in the cable separating the respective lengths;

Figure 2 is an enlarged view showing a portion of the structure of Figure 1 at one of the humps and in this instance the middle one;

Figure 3 is a cross-section taken on the line 3—3 of Figure 2;

Figure 4 is a further enlarged fragmentary view of a portion of the cable with the outer covering broken away and showing the individual, enclosed conductors;

Figure 5 is a view on the scale of Figure 1 showing an individual length of cable after the humps at each end of such length have been severed, the cable being in retracted condition; and Figure 6 shows the cable of Figure 5 in somewhat extended or stretched condition.

Referring in detail to the drawing and looking first at Figure 4 thereof, it will be seen that the cable or conductor cord to which the present invention pertains is here shown as comprising three separately insulated wire electrical conductors 10, 11 and 12 which are each provided with the usual insulation 13, 14 and 15, respectively, and which furthermore are braided or twisted together to form a joint helix 16, each of the separate insulated conductors 10, 11 and 12 being also individually in the form of a helix.

The joint helix 16 thus formed is encased as by extruding thereupon a uniform coating or sheath of somewhat pliable vulcanizable material 17, such as a rubber-like substance either of conventional somewhat raw rubber or of a synthetic elastomer of which there are many now on the market. The continuous sheath 17 say of rubber may be preliminarily cured to the extent in this instance so that the rubber will not be readily distorted or adhere to adjacent rubber surfaces upon further vulcanization.

Next the whole is coiled again into another exterior helix 18, with, desirably, the convolutions of the exterior helix 18 rotating in the same direction as those of the interior helix 16. By this is meant that if one were to look at either end of the helix, the direction of rotation of the convolutions or pitch is somewhat similar to a right-hand thread on a screw in that it proceeds clockwise about the common axis as the convolutions lead away from the eye of the beholder.

The formation of the braided helix 16 and its sheath 17 of vulcanizable material is not a part of the present invention, but this invention begins with the intermediate product thus formed and with the production thereof into the exteriorly coiled helix 18 and the subsequent treatment thereof to produce the readily extensible and retractile elastic coil cables first herein above mentioned, the details of which as here specifically set forth and following the present invention will next be described.

For producing the exteriorly helically coiled cables, a mandrel may be provided in the form, as here shown, of a metal rod 19 upon which the cable initially in somewhat straight continuous formation as at 17, may be coiled and later may be placed in an oven or the like for vulcanizing as here subsequently more particularly referred to. For coiling purposes, the rod 19 may be mounted in any suitable chuck-like supports for rotation on its longitudinal axis, which supports and means of rotation form no part of the present invention and are therefore not here shown, it being sufficient for the present purposes to state that the mandrel or rod 19 is suitably rotated and the cable may be introduced manually thereupon for coiling.

It will be observed that the coiling of the cable on the rod 19 is in a direction to produce the clockwise or righthand thread convolutions 18 already referred to, it having been found that this coiling of the outer helical in the same direction as the coils of the inner helical 16 of the separate conductors causes these helices to work together instead of against each other, particularly in that when the cable is manipulated the inner helices 16 do not tend to become untwisted, when retracted or extended as in the final product shown in Figures 5 and 6.

It is desirable that a particular length of such cable 20, individually shown in Figure 5, should have at each end a connecting tail 21, for any desired extension cord purposes, as, for example, for attachment at one end to the base of a so-called cradle-type telephone, and, at the other end, to the receiver-transmitter of the telephone, and, furthermore it is advantageous, for speed and economy of manufacture, that a plurality of the individual cable lengths shown in Figure 5 be preliminarily connected together prior to and during curing.

In accordance with the present invention both of these objects, that is, the formation of the connecting tails and the economy of production are accomplished by using a rod 19 which is long enough, as shown in Figure 1, to accommodate a plurality of preliminarily interconnected cable lengths 22, two such lengths being here shown merely by way of example, it being understood that three or four such interconnected preliminary lengths of cable as at 22 might be disposed on a single rod 19, the rod being made any length for that purpose within limits affording feasibility of rotation of the rod and the handling of the rod with the coiled cable thereupon.

As here illustrated, beginning say at the left-hand end of the rod 19, a relatively short portion of the cable as at 23 may be manually wound about the rod 19 to effect an anchorage of the cable thereto for subsequent mechanical rotation. After winding the lead 23 of the cable on the rod, a portion of the cable is then formed uncoiled, as, in this instance by forming a hump 24 in the cable which is here formed by means extending transversely of the rod 19, such as the post or peg 25. As best shown in Figures 2 and 3, the peg 25, conveniently made say of wood, may be a simple straight piece of slightly greater width than thickness and arcuately recessed at each end. The peg is placed in engagement with t' rod 19, the arcuate recess 26 at this end accommodating the curvature of the rod, the peg having its dimension of width cross-wise of the rod. At its other or outer end, the peg is similarly arcuately recessed or concaved as at 27 and the cable led thereover to provide the hump 24 as at A, Figure 1, the hump thus being of V-shape and having the legs 28 and 29 and the concavity 27 receiving the cable to avoid slippage therefrom.

As the leg 29 continues into the helical coil 22, to produce which the rod 19 may now be mechanically rotated, the peg 25 is maintained in position by the cable extending transversely of the rod and at the same time the peg maintains the hump formation 24 in the cable. As the helical coiling of the cable on the rod continues and when sufficient cable has been coiled to make any desired predetermined length of individual cable, another peg 25 is interposed as at B and another hump 24 produced in the cable. Thereupon coiling is again continued to provide another preliminary cable length 22 and, in this instance, to effect a third hump 24 as at C. Finally a short length of the cable as at 30 may be manually coiled to effect an anchorage at this end of the rod.

The rod 19, with the coiled cable thereon, may now be removed from whatever mechanical support may have been employed for mechanically rotating the rod and the whole placed in the oven for curing, but before doing so, it is desirable to perform another of the steps of the present invention next referred to.

It has been found that bubbles of air or other gas are likely to be created within the interior of the cable during baking at the places where the humps 24 occur unless means are provided for preventing this, and which would otherwise impair the cable. To prevent this, I desirably vent the cable where the humps are formed, as in this instance by cutting through the sheath 17, with a scissors or knife to effect a notch 31 in the cable advantageously at the apex of the hump 24 where it passes around the outer end 27 of the peg 25 and on the outer side of the cable, thus permitting gas or air which expands at the hump during baking to escape without causing the creation of bubbles, or gas pockets.

After vulcanization of the cable on the rod 19 to any desired degree to produce a permanent set of the cable in helical form and to a degree which makes the vulcanizable material 17 springy and resilient, the rod 19 with the cable thereon is removed from the oven and the humps 24 are then completely severed conveniently at the places where the notches 31 occur, and the cable is then slipped from the rod 19.

It will now be understood that, as here illustrated, there will have been formed two individual lengths of cable 20, as shown in Figure 5, from each of the preliminary lengths 22 shown in Figure 1, and that the hump legs 29 of the humps A and B at one end of each of the preliminary cable lengths 22 now provide a connecting tail or tangent as at 21 at the left-hand side of Figure 5 for the final individual cables 20, and that the legs 28 of the humps B and C provide the other connecting tail or tangent at the right-hand side of Figure 5 for the individual cables 20. The leg 28 of hump A and the leg 29 of hump C, which remain integral respectively with leading end 23 and the trailing end 30 of the cable, are discarded with these anchorage portions 23 and 30.

As suggested in Figure 6 the helically coiled cable 20 is readily extensible, Figure 6 being merely suggestive of this and the cable in fact being extensible to a much greater extent than shown in Figure 6 to in fact almost, say, somewhat flatten out the coils while still being readily retracted automatically by its own resilience to closely compacted helical formation as at 20, when released, and thus having many useful applications where the requirements call for a well insulated and durable electric cable which is extensible and automatically retractile so as to avoid becoming entangled with other objects or being in the way of the user.

It is to be understood that the term helical is used here in its broadest sense and represents a coil or spiral produced when a strand is flexuously compacted about a mandrel or a plurality of mandrels the transverse cross-section of which may be triangular, square, rectangular, circular, oval or any modification or combination of these shapes produced with or without a mandrel.

By elastomer is meant any natural or synthetic rubber, plastic or rubber substitute exhibiting suitable characteristics of toughness, elasticity, extensibility and resilience, the product known as Buna S, for example, being suitable.

The reference to a vulcanizable material is intended to cover any rubber-like material, such as so-called Buna S, which is capable of being set to a springy, resilient condition by suitable treatment and also the reference to vulcanizing the material is intended to cover the curing or the like of a rubber-like material by heat or any suitable treatment for the purpose.

It is furthermore to be understood that the invention is not intended to be limited to details of sequence of operation of the methods here disclosed to exemplify the practice thereof, and such changes may be made as fall within the scope of the appended claims without departing from the invention.

The invention having been described, what is here claimed is:

1. The method of making elastic coil cables rendered elastic by having a covering of rubber-like material which is characterized by the steps of coiling a plurality of separately insulated conductors together each in the form of a helix and braided together forming a joint helix, encasing the conductors in a sheath of vulcanizable elastic material to form a cable, coiling the cable in another exterior helix, with the convolutions of said exterior helix rotating in the same direction as the coils of the helices of said conductors, discontinuing said exterior helix, forming a hump in the cable where said exterior helix is discontinued, notching the sheath adjacent the apex of said hump to provide a vent, vulcanizing the cable, and severing the hump to provide an uncoiled end for the cable, whereby said uncoiled end is adapted to serve as a connecting tangent for the cable.

2. The method of making elastic coil cables of the class described which is characterized by encasing a conductor in a sheath of vulcanizable material to form a cable, comprising the steps of coiling the cable in a helix, discontinuing the helix in the form of a hump including a pair of legs and an apex, cutting into the sheath adjacent the apex of said hump and on the exterior of said hump to provide a vent, vulcanizing the material, and severing the hump adjacent said vent whereby one of said legs provides an uncoiled end for the cable, said uncoiled end being adapted to serve as a connecting tangent tail for the cable.

PAUL C. GERATY.